United States Patent [19]

Rus

[11] Patent Number: 5,658,046

[45] Date of Patent: Aug. 19, 1997

[54] VEHICLE SEAT TRIM COVER ATTACHMENT STRIP

[75] Inventor: Liviu Rus, Troy, Mich.

[73] Assignee: Lear Corporation, Southfield, Mich.

[21] Appl. No.: 587,200

[22] Filed: Jan. 16, 1996

[51] Int. Cl.⁶ .................................. B60N 2/02; B60N 2/36
[52] U.S. Cl. .............................. 297/378.1; 297/378.12; 296/65.1; 296/66; 296/39.1; 16/4
[58] Field of Search ................... 297/378.1, 378.12; 296/63, 65.1, 66, 39.1; 24/458, 297, 697.1; 403/405.1

[56] References Cited

U.S. PATENT DOCUMENTS

| | | |
|---|---|---|
| 2,100,017 | 11/1937 | Van Uum . |
| 2,152,505 | 3/1939 | Stuart et al. ............................ 296/65.1 |
| 2,185,816 | 1/1940 | Marshall . |
| 2,200,047 | 5/1940 | Tinnerman . |
| 2,222,449 | 11/1940 | Tinnerman . |
| 2,249,895 | 7/1941 | Hall . |
| 2,618,033 | 11/1952 | Tinnerman et al. . |
| 2,657,948 | 11/1953 | Sturtevant ............................ 16/4 X |
| 2,658,247 | 11/1953 | Heuer . |
| 3,011,822 | 12/1961 | May et al. ............................ 296/66 |
| 3,013,838 | 12/1961 | Semar et al. ......................... 296/66 |
| 3,049,585 | 8/1962 | Cochran . |
| 3,053,565 | 9/1962 | Farrow ................................ 296/66 |
| 3,097,881 | 7/1963 | Aguilar ............................... 296/66 |
| 3,117,758 | 1/1964 | Bauer . |
| 3,202,453 | 8/1965 | Richards ............................. 296/66 |
| 3,420,482 | 1/1969 | Taylor . |
| 3,441,986 | 5/1969 | Pritchard . |
| 3,703,310 | 11/1972 | Lystad ................................ 296/66 X |
| 4,133,556 | 1/1979 | Glinski ................................ 296/65.1 |
| 4,268,086 | 5/1981 | Okuyama ........................ 297/378.12 X |
| 4,382,629 | 5/1983 | Froumajou ........................... 296/66 X |
| 4,406,033 | 9/1983 | Chisolm et al. ....................... 16/4 |
| 4,609,170 | 9/1986 | Schnabl . |
| 4,653,138 | 3/1987 | Carder ............................... 16/4 |
| 4,683,622 | 8/1987 | Oehlke . |
| 4,789,201 | 12/1988 | Selbert . |
| 4,840,345 | 6/1989 | Neil et al. . |
| 4,848,826 | 7/1989 | Kuwabara et al. ................. 296/65.1 X |
| 4,865,281 | 9/1989 | Wollar . |
| 4,979,772 | 12/1990 | Carey et al. ......................... 296/39.1 |
| 4,979,773 | 12/1990 | Eubank ............................... 296/65.1 |
| 5,011,210 | 4/1991 | Inoue . |
| 5,040,752 | 8/1991 | Morrison . |
| 5,044,683 | 9/1991 | Pärsson ......................... 297/378.12 X |
| 5,322,335 | 6/1994 | Niemi ............................... 296/39.1 X |
| 5,401,075 | 3/1995 | Venuto et al. . |
| 5,527,089 | 6/1996 | Takeda et al. ................. 297/378.12 X |

*Primary Examiner*—Peter M. Cuomo
*Assistant Examiner*—Rodney B. White
*Attorney, Agent, or Firm*—Howard & Howard

[57] ABSTRACT

A vehicle seat assembly having a seat bottom and seat back pivotally couple to a support stanchion. A rear cargo support platform having a horizontal ledge is spaced behind the seat back for providing an extended cargo area when the seat back is pivoted to a horizontal folded position. An upholstered trim cover encases the seat back and includes a peripheral edge adjacent the ledge of the support platform. A trim strip is stitched to the edge of the trim cover and includes a hook portion and a plurality of locking tabs for attaching the edge of the trim cover to the support stanchion and covering the space between the seat back and the rear cargo support platform.

9 Claims, 5 Drawing Sheets

VEHICLE SEAT TRIM COVER ATTACHMENT STRIP

TECHNICAL FIELD

The subject invention relates to attaching an edge of a trim cover to a vehicle seat and, more particularly, to a trim strip for securing the trim cover to the seat and covering a space between the seat and the vehicle rear cargo support platform.

BACKGROUND OF THE INVENTION

Attachment members are commonly known in the automotive seating art for attaching the carpeting or upholstered seat cover to the seat structure. Such attachment members often include sewing the cover to the seat, using a draw string to cinch the cover around the seat or using plastic locking clips or fasteners to secure the cover to the seat.

The U.S. Pat. No. 4,798,201 to Selbert, issued Dec. 6, 1988, discloses a plastic trim attachment strip sewn to a seat cover and including a plurality of barbed projections which are inserted into slots in the seat support frame to secure the cover to the underside of the seat frame.

Alternatively, the U.S. Pat. No. 5,011,210 to Inoue, issued Apr. 30, 1991, discloses an attachment member secured to the end of the carpet of the vehicle rear cargo support platform for attachment to the seat support frame. The attachment member includes a hook which is received in a recess in the seat frame and engages a flange in the recess. The carpet extends from the rear cargo support platform over the rear surface of the vehicle seat back which may be pivoted to a load carrying position aligned with the rear cargo support platform.

It remains desirable to provide an attachment member or fastener for attaching the trim cover to the seat while providing an aesthetic contoured seat covering. More specifically, it remains desirable to provide an attachment member which secures the trim cover to the seat and extends the trim cover toward the vehicle rear cargo platform to cover any exposed area or space between the seat and the cargo platform.

SUMMARY OF THE INVENTION AND ADVANTAGES

A vehicle seat assembly comprises a generally horizontal seat bottom portion and a generally upright seat back portion pivotal between an upright seating position and a generally horizontal folded position. A support stanchion pivotally supports the seat back and a rear cargo support platform extends horizontally from a front ledge which is spaced from and behind the seat back portion. A trim cover for covering the seat back portion has a peripheral edge adjacent the ledge of the support platform. A trim strip having a first portion fixedly secured to the peripheral edge of the trim cover and second portion attached to the support stanchion extends the edge of the trim cover over the space between the seat back and the ledge of the support platform to cover the space during all pivotal movement of the seat back between the seating position and the folded position.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
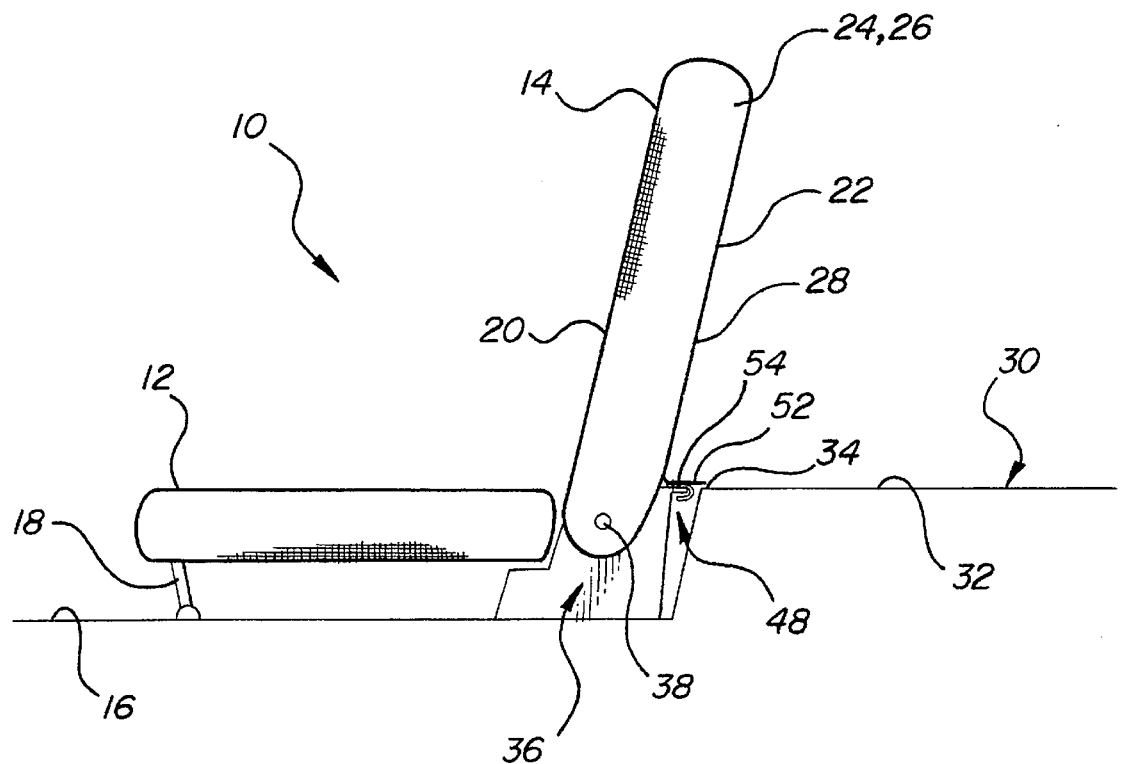
FIG. 1 is a side view of the vehicle seat assembly with the seat back in the upright seating position.
Figure 2:
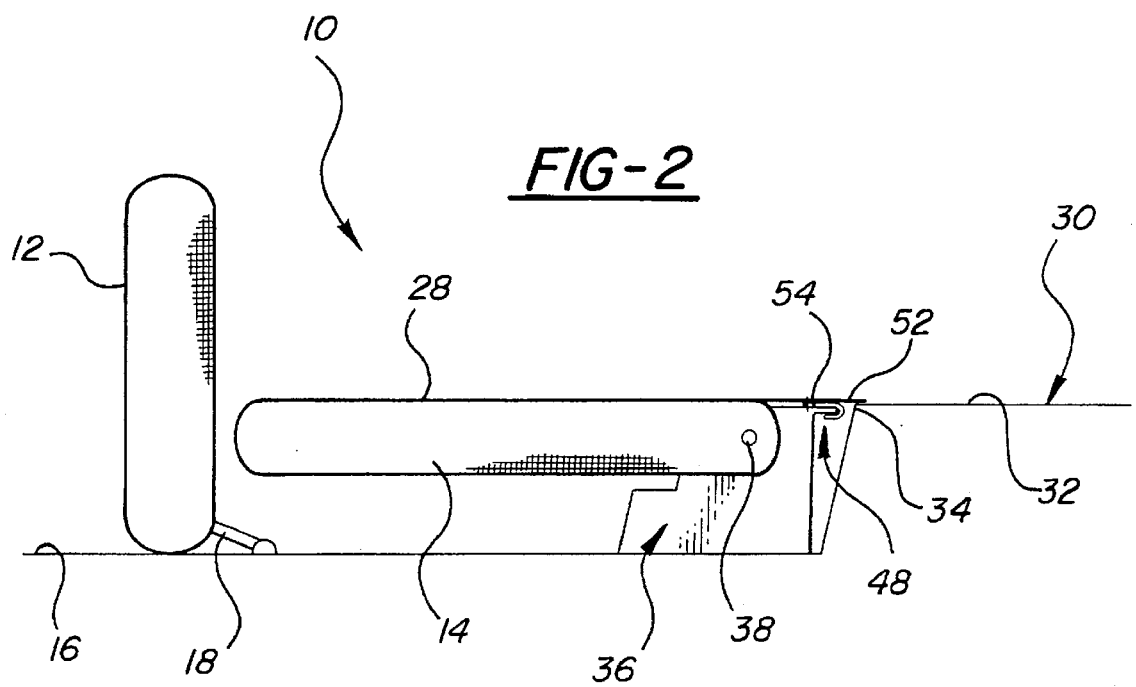
FIG. 2 is a side view of the vehicle seat assembly with the seat back in the horizontal folded position.
Figure 3:
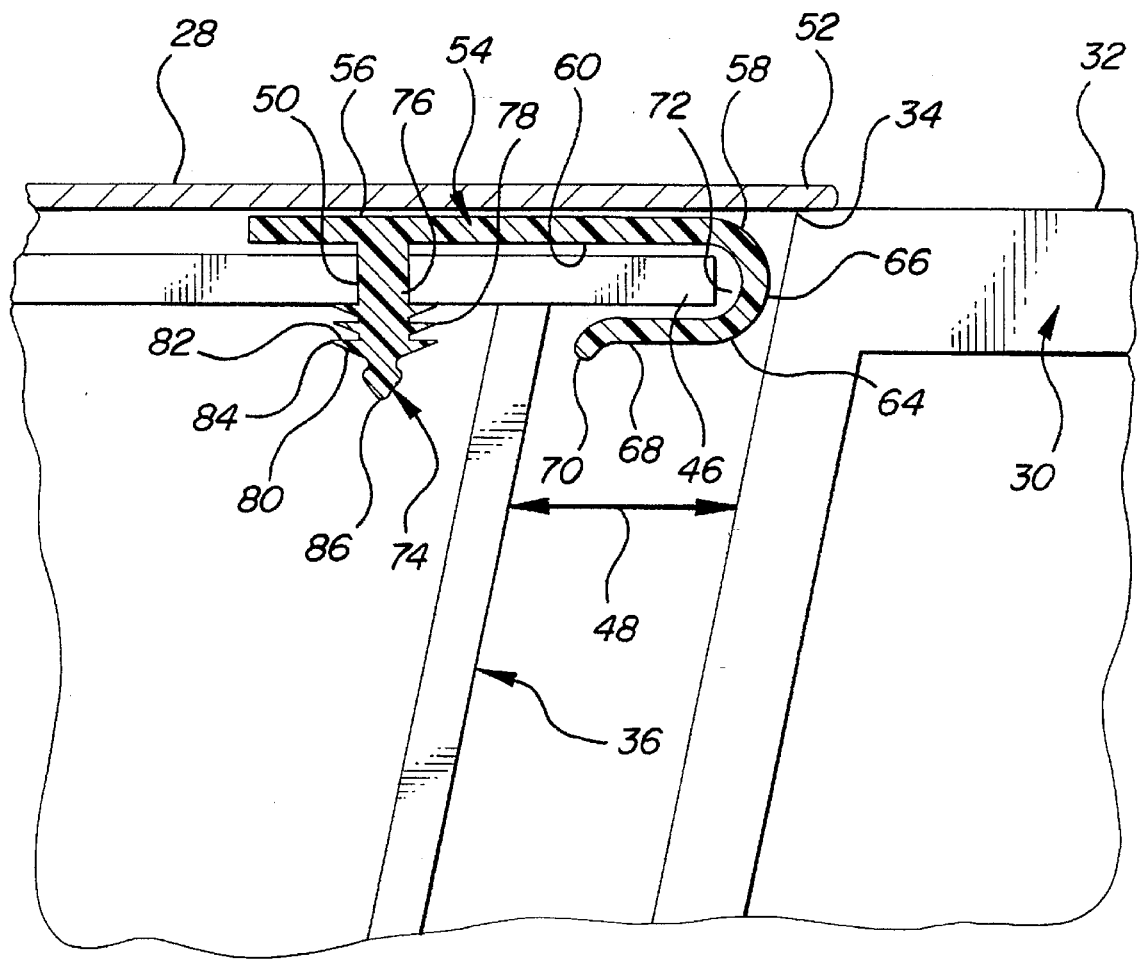
FIG. 3 is a side view of the trim strip attached to the support stanchion between the seat back and support platform.

Referring to the Figures, wherein like numerals reference like or corresponding parts throughout the several views, an automotive vehicle seat assembly is generally shown at 10 in FIGS. 1 and 2. The seat assembly comprises a generally horizontal seat bottom portion 12 upon which an occupant sits, and a generally upright seat back portion 14 pivotal between an upright seating position, as shown in FIG. 1, and a generally horizontal folded position, as shown in FIG. 2. Similarly, the seat bottom 12 is spaced above the vehicle floor 16 by a front riser 18 which is pivotally secured to the vehicle floor 16 to provide pivotal movement of the seat bottom 12 between a seating position, as shown in FIG. 1, and a generally upright folded position, as shown in FIG. 2.

Each of the seat bottom 12 and seat back 14 include a rigid frame structure usually of tubular metal construction. The seat frame is commonly covered by a resilient contoured foam cushion consisting of polyester or the like and encased in a trim cover typically of upholstered cloth fabric, vinyl or leather. More specifically, the seat back 14 includes a front surface 20, a rear surface 22 and opposing first 24 and second 26 sides, commonly referred to as bolsters, and a trim cover 28 encasing the seat back 14.

A rear cargo support platform is shown at 30 and is raised vertically above the vehicle floor 16 and has a platform surface 32 parallel with the surface of the vehicle floor 16. The support platform 30 extends horizontally from a front ledge 34 which is spaced from and behind the seat back portion 14. The platform surface 32 is often covered in carpet or a matting substrate.

Figure 7:
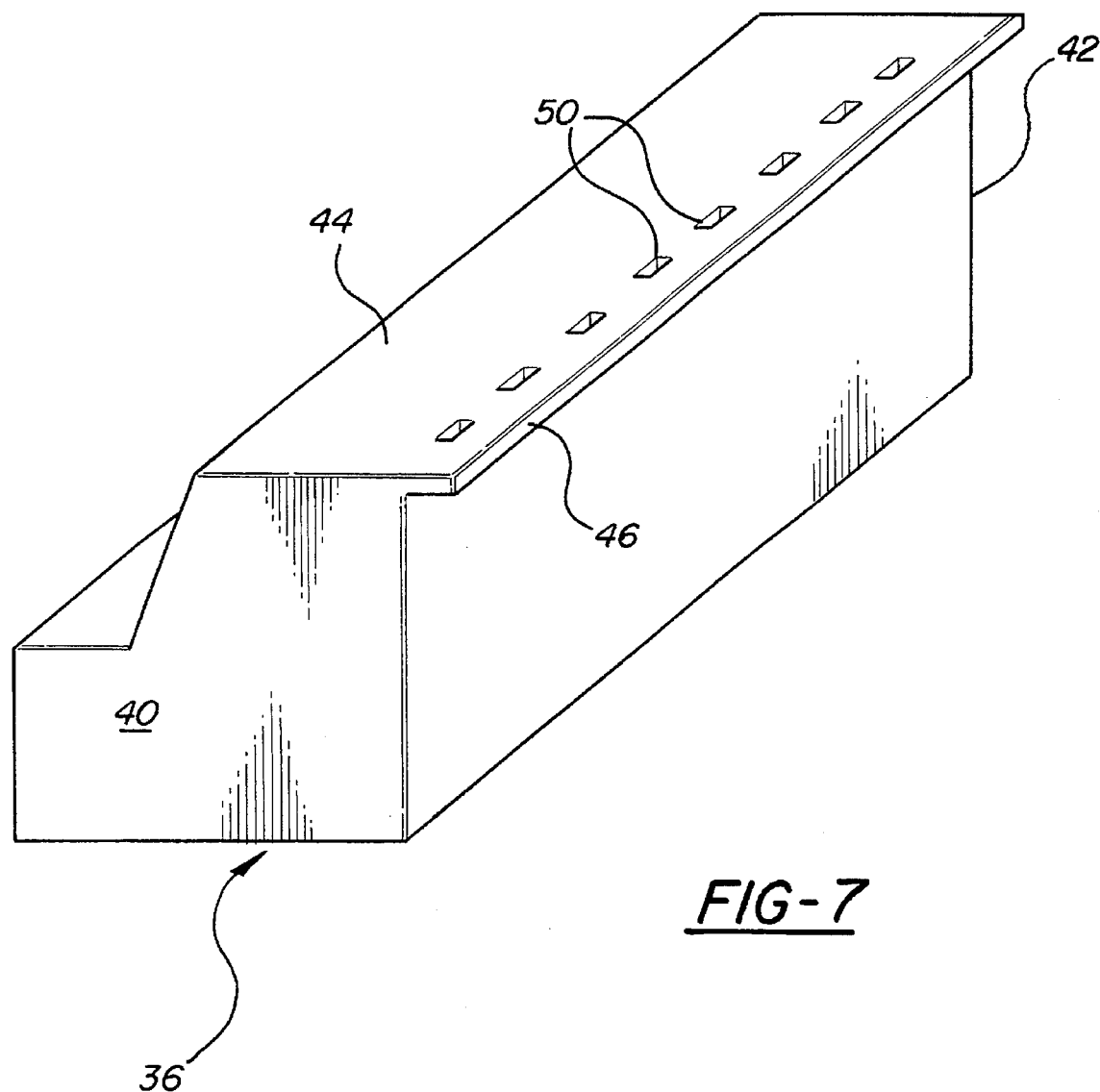
FIG. 7 is a perspective view of the support stanchion.

A seat support stanchion 36 is secured to the vehicle floor 16 and pivotally supports the seat back 14 at pivot axis 38. The support stanchion 36 may also partially support the seat bottom 12 as shown in FIG. 1. Referring to FIG. 7, the support stanchion 36 includes first 40 and second 42 ends extending longitudinally between opposing first 24 and second 26 sides of the seat back 14. A horizontal upper support plate 44 extends between the first 40 and second 42 ends of the stanchion 36. The support plate 44 includes a rearwardly projecting flange 46, or overhanging lip, extending toward the front ledge 34 of the rear cargo support platform 30. The flange 46 is spaced a predetermined distance from the ledge 34 forming a gap or space 48 therebetween. The support plate 44 further includes a plurality of generally rectangular apertures 50 spaced an equal distance from the edge of the flange 46 and spaced longitudinally between the first 40 and second 42 ends of the support stanchion 36.

The trim cover 28 encasing the seat back 14 often includes a carpeted or upholstered portion along the rear surface 22 of the seat back 14. The trim cover 28 includes a peripheral edge 52 adjacent to the front ledge 34 of the support platform 30 and terminating along the bottom of the rear surface 22 of the seat back 14.

The seat assembly 10 is characterized by a trim strip 54 having a first portion 56 fixedly secured to the peripheral edge 52 of the trim cover 28 and a second portion 58 attached to the support stanchion 36 for extending the edge 52 of the trim cover 28 over the space 48 between the ledge 34 of the support platform 30 to cover the space 48 during all pivotal movement of the seat back 14 between the seating position and the folded position.

More specifically, referring to FIGS. 3–6, the trim strip 54 extends longitudinally along the edge 52 of the trim cover 28 between the first 24 and second 26 sides of the seat back 14. The trim strip 54 consists of polypropylene or similar plastic material and includes a body portion 60 extending longitudinally between the first 40 and second 42 ends of the support plate 44 and is fixedly secured to the peripheral edge 52 of the trim cover 28 by a plurality of stitches 62, such as fabric threads. The body portion 60 is a generally horizontal and flat rectangular section and includes a J-shaped hook portion 64 for engaging the flange 46 of the support platform 30. The hook 64 has a curved section 66, a leg section 68 parallel with the body portion 60 and terminating at a upwardly bent distal end 70. The leg section 68 is spaced from the body portion 60 forming an opened U-shaped channel 72 therebetween. The flange 46 is received in the channel 72 and engaged between the body portion 60 adjacent the hook 64 and the leg section 68. The upwardly bent distal end facilitate easy entrance of the flange 46 into the channel 72.

Figure 5:
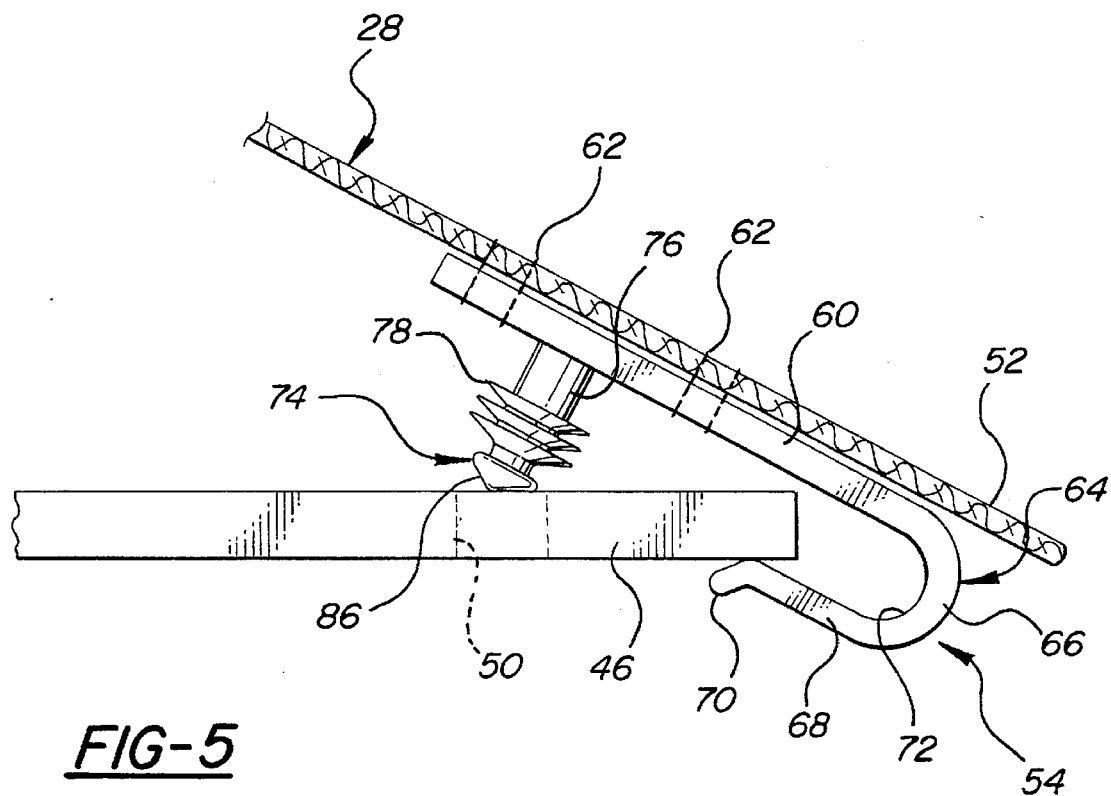
FIG. 5 is a side view of the trim strip partially attached to the support stanchion.
Figure 6:
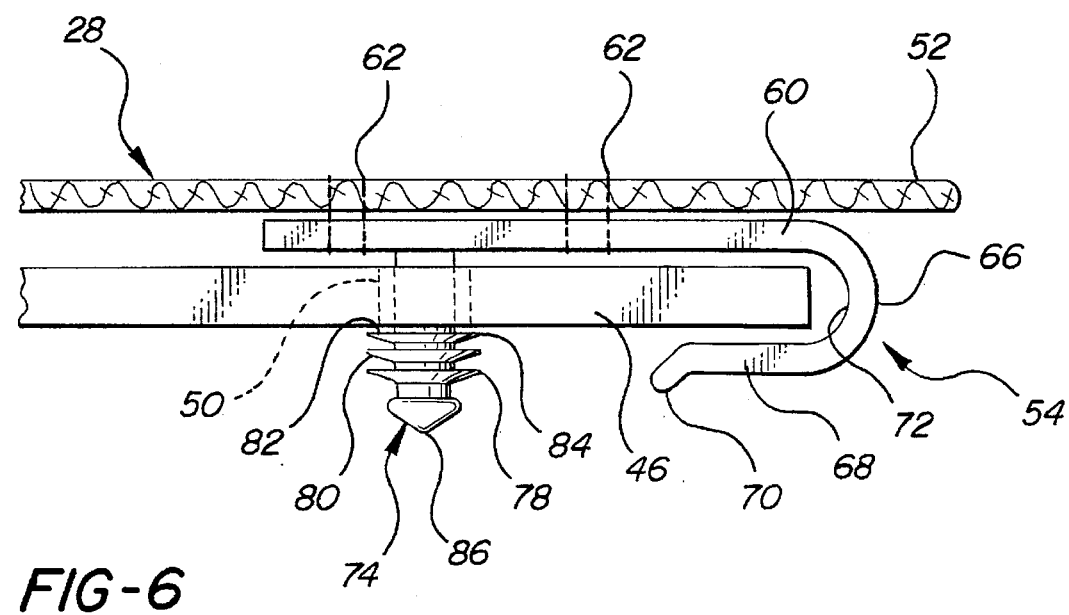
FIG. 6 is a side view of the trim strip fully attached to the support stanchion.

Referring to FIGS. 5 and 6, the trim strip 54 further includes a plurality of outwardly extending locking tabs 74 which are received in the apertures 50 of the upper support plate 44 for locking the trim strip 54, and thus trim cover 28, to the support stanchion 36. The locking tabs 74 extend downwardly and perpendicular from the body portion 60 of the trim strip 54 and are spaced from the distal end 70 of the hook 64. The tabs 74 are further spaced apart longitudinally along the body portion 60 between first 40 and second 42 ends of the support plate 44 to correspond with the apertures 50.

Each tab 74 includes a base 76 integrally formed with the body portion 60. The base 76 extends into a plurality of opposingly faced projecting barbs 78 having an angled bottom cam surface 80, a flat top locking surface 82 and a pointed end 84. Each tab 74 terminates with a rounded nose portion 86.

Again referring to FIGS. 5 and 6, the peripheral edge 52 of the trim cover 28 is stitched to the body portion 60 of the trim strip 54. The hook 64 is attached around the flange 46 to urge the flange 46 between the body portion 60 and the leg portion 68. The trim strip 54 may then be press against the upper support plate 44 of the stanchion 36 with the apertures 50 receiving the nose portion of the locking tabs 74. The locking cam surfaces 80 of each barb 78 contact the edges of the apertures 50 and deflect slightly to pass the barbs through the apertures 50 and around the base 76. The locking surface 82 of the barbs 78 abut the edges of the aperture 50 to prevent the tabs 74 from being withdrawn from the apertures 50 and thus retaining the trim strip 54 locked to the stanchion 36.

The peripheral edge 52 of the trim cover 28 extends along the trim strip 54 toward the hook portion 64 and may extend partially therebeyond. The edge 52 may be positioned to abut adjacent the ledge 34 of the support platform or partially overlap the ledge 34 as shown in the Figures, to cover the space 48 between the stanchion 36 and the ledge 34 of the rear cargo support platform. Also as shown in FIGS. 1 and 2, the trim cover 28 forms a crease or fold along the body portion 60 with the seat back 14 in the upright seating position and yet extends flat and horizontal with the platform surface with the seat back 14 in the folded position.

Figure 4:
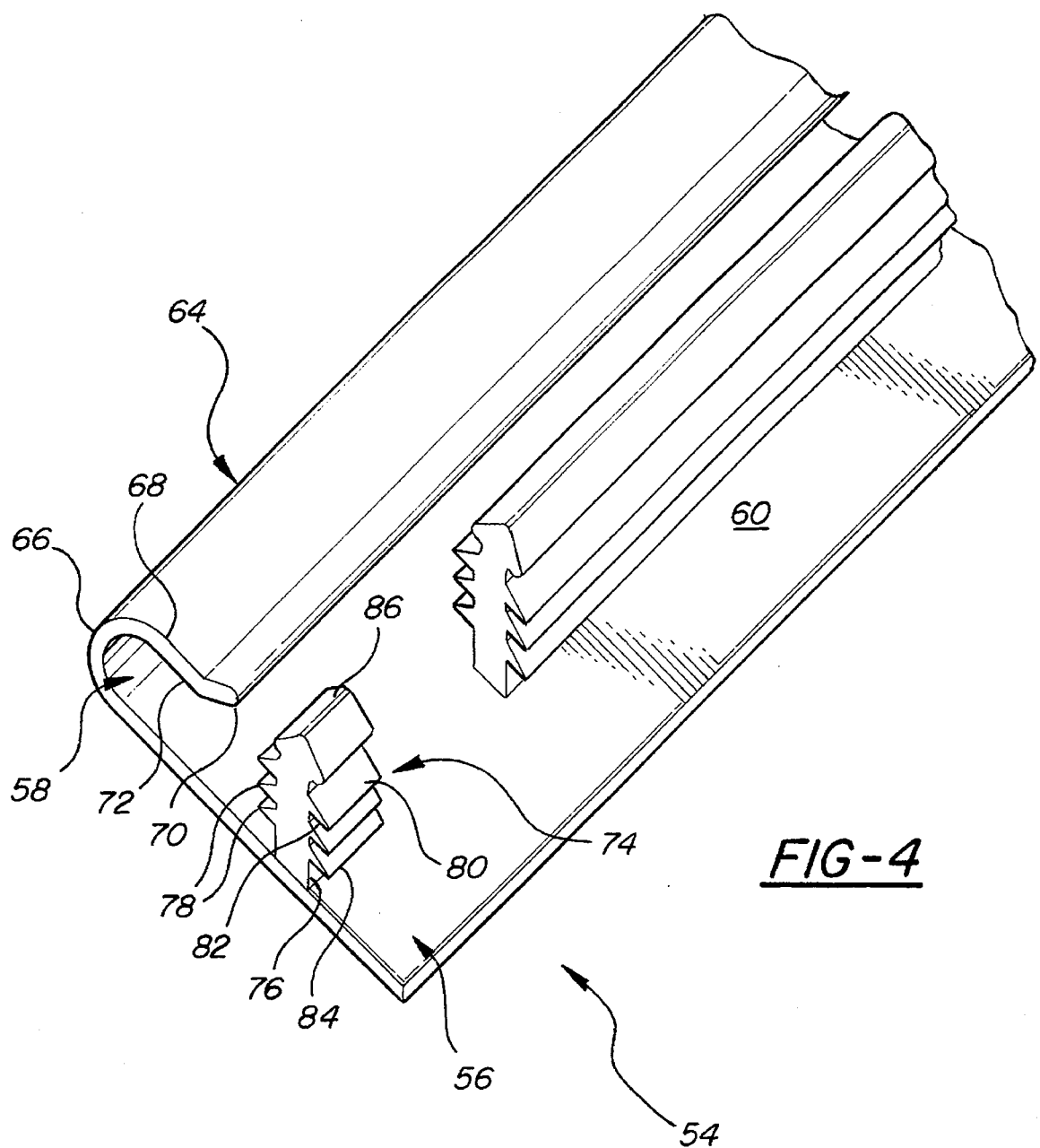
FIG. 4 is a partial perspective view of the trim strip of the subject invention.

Finally, as shown in FIG. 4, the trim strip 54 may be manufactured by extruding a plastic strip to form the longitudinal hook 64 and form a continuous longitudinally extending tab 74 extending between first and second ends. The continuous tab 74 may then be cut or partitioned into separate spaced apart locking tabs 74 at predetermined spaced apart distances corresponding to the apertures 50 in the stanchion 36.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practice otherwise than as specifically described.

What is claimed is:

1. A vehicle seat assembly comprising:
 a vehicle floor for supporting a generally horizontal seat bottom portion and a generally upright seat back portion for pivotal movement between an upright seating position and a generally horizontal folded position;
 a support stanchion fixedly secured to said vehicle floor for pivotally supporting said seat back portion between said upright and said folded positions;
 a rear cargo support platform extending horizontally from a front ledge which is spaced from and behind said seat back portion and defining a space therebetween;
 a trim cover for covering said seat back portion, said trim cover having a peripheral edge adjacent said ledge of said support platform; and
 a trim strip having a first portion fixedly secured to said peripheral edge of said trim cover and a second portion attached to said support stanchion for extending said edge of said trim cover over said space between said seat back and said ledge of said support platform to cover said space during all pivotal movement of said seat back between said seating position and said folded position.

2. A vehicle seat assembly as set forth in claim 1 further characterized by said seat back portion having a front surface, a rear surface and opposing first and second sides, said trim cover encasing said seat back portion with said peripheral edge terminating along the said rear surface adjacent said ledge of said support platform.

3. A vehicle seat assembly as set forth in claim 2 further characterized by said trim strip extending longitudinally along said edge of said trim cover between said first and second sides of said seat back.

4. A vehicle seat assembly as set forth in claim 3 further characterized by said support stanchion having first and second ends extending longitudinally between opposing first and second sides of said seat back and including an upper support plate extending between said first and second ends, said upper support plate including a rearwardly projecting flange extending toward said ledge of said rear cargo support platform and a plurality of apertures spaced longitudinally along said upper support plate between said first and second ends.

5. A vehicle seat assembly as set forth in claim 4 further characterized by said trim strip including a body portion extending longitudinally between said first and second ends of said support plate and fixedly secured to said peripheral edge of said trim cover, said body portion having a generally J-shaped hook portion for engaging said flange of said support platform.

6. A vehicle seat assembly as set forth in claim 5 further characterized by said trim strip including a plurality of outwardly extending locking tabs received in said apertures of said upper support plate for locking said trim strip to said support stanchion.

7. A vehicle seat assembly as set forth in claim 6 further characterized by said body portion of said trim strip fixedly secured to said peripheral edge of said trim cover by a plurality of stitches.

8. A vehicle seat assembly comprising:

a vehicle floor for supporting a generally horizontal seat bottom and a generally upright seat back for pivotal movement between an upright seating position and a generally horizontal folded position;

a rear cargo support platform extending horizontally from a front ledge which is spaced from and behind said seat back and defining a space therebetween;

a support stanchion fixedly secured to said vehicle floor for pivotally supporting said seat back between said seating and folded positions, said support stanchion having an upper support plate including a rearwardly projecting flange extending toward said ledge of said support platform;

a trim cover for covering said seat back, said trim cover having a peripheral edge adjacent said ledge of said support platform; and a trim strip having a body portion fixedly secured to said peripheral edge of said trim cover and a generally J-shaped hook portion for engaging said flange of said support stanchion for securing and extending said edge of said trim cover over said space between said seat back and said ledge of said support platform to cover said space during all pivotal movement of said seat back between said seating position and said folded position.

9. A vehicle seat assembly as set forth in claim 8 wherein said upper support plate includes at least one aperture and said trim strip inlcudes at least one outwardly extending locking tab received in said aperture for locking said trim strip to said support stanchion.

* * * * *